(12) United States Patent
Takahashi (10) Patent No.: US 7,373,002 B2
(45) Date of Patent: May 13, 2008

(54) IMAGE PROCESSING APPARATUS AND METHOD, AND COMPUTER PROGRAM

(75) Inventor: Hironobu Takahashi, Tokyo (JP)

(73) Assignee: Sony Corporation, Tokyo (JP)

( * ) Notice: Subject to any disclaimer, the term of this patent is extended or adjusted under 35 U.S.C. 154(b) by 655 days.

(21) Appl. No.: 11/000,780

(22) Filed: Dec. 1, 2004

(65) Prior Publication Data

US 2005/0135781 A1    Jun. 23, 2005

(30) Foreign Application Priority Data

Dec. 2, 2003    (JP)    ............... 2003-403730

(51) Int. Cl.
*G06K 9/36* (2006.01)

(52) U.S. Cl. ................................. 382/232

(58) Field of Classification Search ................ 382/100, 382/232, 305, 306; 348/461, 465, 467; 386/94; 380/200, 203, 205, 209, 210, 212, 252, 253, 380/54, 55, 255, 257; 370/527, 529; 705/57, 705/58; 713/176, 182, 187, 189; 358/3.28; 725/20, 22; 708/203
See application file for complete search history.

(56) References Cited

U.S. PATENT DOCUMENTS 5,983,251 A * 11/1999 Martens et al. ............. 708/203

FOREIGN PATENT DOCUMENTS

| JP | 9 224213 | 8/1997 |
|---|---|---|
| JP | 2002 16867 | 1/2002 |
| JP | 2002 204465 | 7/2002 |
| JP | 2002 314937 | 10/2002 |

* cited by examiner

*Primary Examiner*—Jose L. Couso
(74) *Attorney, Agent, or Firm*—Frommer Lawrence & Haug LLP; William S. Frommer (57) ABSTRACT

The present invention provides an image processing apparatus that records currently displayed video onto an external medium as a still image. A JPEG file includes compressed data and auxiliary Exif information, and the auxiliary information includes a user information tag that can be used by a user. When a TV set records a still image according to JPEG, product model information about the TV set is written in the user information tag. Since TV sets have variations in the number of displayed pixels and the optimum image signal processing method from one product model to another, the TV set refers to the Exif information when playing back the JPEG file. If the Exif information includes product model information about the TV set, the JPEG file is subjected to the optimum signal processing based on the product model information, and is then displayed.

15 Claims, 6 Drawing Sheets

| CLASS | TAG NAME (FIELD NAME) | TAG NUMBER Dec | TAG NUMBER Hex | TYPE | TYPE |
|---|---|---|---|---|---|
| A VERSION TAG | | | | | |
| | Exif Version | 36864 | 9000 | UNDEFINED | 4 |
| | Flash Pix Version | 40960 | A000 | UNDEFINED | 4 |
| B IMAGE DATA CHARACTERISTICS TAG | | | | | |
| | Color Space | 40961 | A001 | SHORT | 1 |
| C STRUCTURE TAG | | | | | |
| | Components Configuration | 37121 | 9101 | UNDEFINED | 4 |
| | Compressed Bits Per Pixel | 37122 | 9102 | RATIONAL | 1 |
| | Pixel X Dimension | 40962 | A002 | SHORT or LONG | 1 |
| | Pixel Y Dimension | 40963 | A003 | SHORT or LONG | 1 |
| D USER INFORMATION TAG | | | | | |
| | Maker Note | 37500 | 972C | UNDEFINED | Any |
| | User Comment | 37510 | 972B | UNDEFINED | Any |
| E RELATED FILE INFORMATION TAG | | | | | |
| | Related Sound File | 40964 | A004 | ASCII | 13 |
| F DATE AND TIME TAG | | | | | |
| | Date Time Original | 36867 | 9003 | ASCII | 20 |
| | Date Time Digitalized | 36868 | 9004 | ASCII | 20 |
| | SubSec Time | 37520 | 9290 | ASCII | Any |
| | SubSec Time Original | 37521 | 9291 | ASCII | Any |
| | SubSec Digitalized | 37522 | 9292 | ASCII | Any |
| G PHOTOGRAPHIC CONDITIONS TAG | | | | | |
| | SEE FIG. 4 | | | | |
| H IFD POINTER | | | | | |
| | Interoperability IFD Pointer | 40965 | A005 | LONG | 1 |

FIG. 4

| G PHOTOGRAPHIC CONDITIONS TAG | | | |
|---|---|---|---|
| Exposure Time | 33434 | B29A | RATIONAL | 1 |
| F Number | 33437 | B29D | RATIONAL | 1 |
| Exposure Program | 34850 | B822 | SHORT | 1 |
| Spectral Sensibility | 34852 | B824 | ASCII | Any |
| ISO Speed Ratings | 34855 | B827 | SHORT | Any |
| OECF | 34856 | B828 | UNDEFINED | Any |
| Shutter Speed Value | 37377 | 9201 | SPATIONAL | 1 |
| Aperture Value | 37378 | 9202 | RATIONAL | 1 |
| Brightness Value | 37379 | 9203 | SPATIONAL | 1 |
| Exposure Bias Value | 37380 | 9204 | SPATIONAL | 1 |
| Max Aperture Value | 37381 | 9205 | RATIONAL | 1 |
| Subject Distance | 37382 | 9206 | RATIONAL | 1 |
| Metering Mode | 37383 | 9207 | SHORT | 1 |
| Light Source | 37384 | 0208 | SHORT | 1 |
| Flash | 37385 | 9209 | SHORT | 1 |
| Focal Length | 37386 | 920A | RATIONAL | 1 |
| Flash Energy | 41483 | 920B | RATIONAL | 1 |
| Spatial Frequency Response | 41484 | A20C | UNDEFINED | Any |
| Focal Plane X Resolution | 41486 | A20E | RATIONAL | 1 |
| Focal Plane Y Resolution | 41487 | A20F | RATIONAL | 1 |
| Focal Plane Resolution Unit | 41488 | A210 | SHORT | 1 |
| Subject Location | 41492 | A214 | SHORT | 2 |
| Exposure Index | 41493 | A215 | RATIONAL | 1 |
| Sensing Method | 41495 | A217 | SHORT | 1 |
| File Source | 41728 | A300 | UNDEFINED | 1 |
| Scene Type | 14729 | A301 | UNDEFINED | 1 |
| CFA Pattern | 41730 | A302 | UNDEFINED | Any |

IMAGE PROCESSING APPARATUS AND METHOD, AND COMPUTER PROGRAM

BACKGROUND OF THE INVENTION

1. Field of the Invention

The present invention relates to an image processing apparatus and method and to a computer program for processing video signals, such as received television signals. In particular, the present invention relates to an image processing apparatus and method and to a computer program for recording a video signal, such as a received television signal, onto an external medium.

More specifically, the present invention relates to an image processing apparatus and method and to a computer program for recording currently displayed video, such as a broadcasted program, onto an external medium as a still image. In particular, the present invention relates to an image processing apparatus and method and to a computer program for recording a still image extracted from a currently displayed video signal onto an external medium so that the recorded still image can be repeatedly used.

2. Description of the Related Art

In the modern information society, broadcasting technologies play important roles. In particular, television (TV) broadcasting that allows direct delivery of audio and video information to subscribers has a large influence. The broadcasting technologies include a wide range of technologies, such as signal processing, signal transmission and reception, and audio and video information processing. Video signals are carried via a variety of media, such as radio waves, e.g., terrestrial and satellite broadcasting waves, cable TV broadcasting, and computer communication.

Due to the wide prevalence of TVs that have been introduced into most houses, broadcasted content delivered from each broadcast station is accessed by the general public. The broadcasted content may also be received and recorded so that the recorded content can be played back at any time, or a memo may be attached to a still image of currently displayed video.

Generally, TV sets have a function for providing a still image of currently displayed video using a "memo" button on a remote control unit. In response to an instruction to activate the video memo function from a user using the remote control unit, currently displayed video is captured as a still image, and the captured still image is displayed on, for example, a sub-screen (see, for example, Japanese Unexamined Patent Application Publication No. 2002-44544). The memo function allows the user to use information included in the supplied video signal without performing any time-consuming operation, and prevents the user from missing displayed video information. The memo function is a temporary display function using a field memory in an internal signal processing device of the TV set, and does not allow an identical still image to be displayed many times.

A still image is typically stored as a computer file using a JPEG (Joint Picture Experts Group) format. JPEG is an image data format in which 24-bit data is recorded by separating brightness signal components and chrominance signal components, and JPEG-compressed data is expanded using a combination of ADCT (adaptive discrete cosine transformation) and Huffman coding. A JPEG image portion may be recorded together with Exif data indicating photographic conditions, etc. The auxiliary Exif information includes user information tags that can be used by a user.

When a digital video camera records a still image as a JPEG file, information indicating the vendor name and the product name is also recorded in user information tags. However, TV sets do not have a function for converting the video currently displayed on the TV set into a JPEG still image file and recording the JPEG file onto an external medium.

TV sets often play back JPEG files that are photographed using digital still cameras and that are recorded onto memory card media. In decoding a JPEG file, however, only information having higher recording compatibility levels than the pseudo-requirements defined in the Exif standard is used, and the information included in the user information tags, which need not be recognized, is not used to decode the JPEG file or to display the still image.

Various type of displays incorporated in TV sets, such as a CRT (Cathode Ray Tube), a PDP (Plasma Display Panel), and an LCD (Liquid Crystal Display), have variations in the number of displayed pixels, and the image signal processing methods may differ from one model to another. Thus, the optimum image signal processing method for displaying the same image source depends upon each model. In order to record a still image using a JPEG format, bitmap data is compressed, thus inevitably causing degradation in the image quality of the reproduced data.

A JPEG file captured using a digital camera may be recorded with exposure conditions, etc., in header information. The condition information may be used to select processing for an image signal to be displayed in order to reduce degradation in the image quality caused by the signal processing other than data compression. However, a TV set performs JPEG conversion on video information in a uniform manner because no Exif information indicating the state of the original image is recorded. Thus, the reproducibility of the playback image with respect to the recorded image is not increased.

A motion video data recording method for extracting a still image from motion video to obtain desired image data is described in, for example, Japanese Unexamined Patent Application Publication No. 2000-333130. In this method, the quality of an image to be recorded is changed in response to an instruction to change the image quality while capturing motion video to reduce the amount of data to be recorded, which is not related to recording and playback of a video signal currently received by a TV set as a still image.

SUMMARY OF THE INVENTION

Accordingly, it is an object of the present invention to provide an image processing apparatus and method, and a computer program for appropriately recording a video signal, such as a received television signal, onto an external medium.

It is another object of the present invention to provide an image processing apparatus and method, and a computer program for appropriately recording currently displayed video onto an external medium as a still image.

It is another object of the present invention to provide an image processing apparatus and method, and a computer program for recording a still image extracted from currently displayed video onto an external medium so that the recorded still image can be repeatedly used.

In a first aspect of the present invention, an image processing apparatus that processes an image signal includes an image signal input unit that receives an image signal, a display processor that performs display processing on the image signal, a code processor that converts the image signal processed by the display processor into a still image file including an image portion and auxiliary information, a device information processor that processes device information about the image processing apparatus, and an external recording medium input and output unit that interchangeably supports an external recording medium, wherein the code processor defines the device information about the image processing apparatus in the auxiliary information for format conversion into the still image file, and the external recording medium input and output unit records the converted still image file onto the external recording medium.

The image processing apparatus may further include a display unit that outputs the image signal processed by the display processor. The display processor may modify the image signal so as to be adapted to the display unit.

In the image processing apparatus according to the present invention, the code processor may convert video, such as a broadcast program, that is displayed when an instruction to record a still image is input from a user into a still image. Thus, the user can specify an image to be stored as a still image while viewing the currently displayed video. This allows the use to use the information included in the video signal without performing any time-consuming operation, and prevents the user from missing the displayed video information. The recording medium may be removed from the image processing apparatus, and the recorded still image may be played back on another display device.

The code processor may write, as the auxiliary information, the device information including information about a display unit, the number of displayed pixels in the display unit, or image modification information in the display processor.

Therefore, the video signal subjected to the display processing is coded and recorded. This meets a demand for the user to record an optimally modified display video signal as a still image.

When a still image recorded in an external recording medium is played back, an image display processing method may be determined based on the device information defined in auxiliary information, and the display processor may perform display processing on the decoded still image using the determined image display processing method. Thus, the display processing adapted to the display device can be performed on the still image to be output on the screen.

The image processing apparatus according to the present invention may be a TV set having a function for recording currently displayed video onto an external medium as a still image in response to an instruction from the user. The still image may be converted into, for example, a JPEG image file including compressed image data and auxiliary Exif information, and may be then recorded.

The auxiliary Exif information may include a user information tag that can be used by the user. When the TV set records a still image according to JPEG, product model information about the TV set may be written in the tag.

TV sets include a variety of display devices, such as a CRT, a PDP, and a LCD, and the number of displayed pixels and the image signal processing method of the display devices differ from one product model to another.

According to the present invention, when a TV set plays back a JPEG file stored in an external recording medium, the TV set decodes the JPEG file to obtain a still image portion, and refers to the Exif information to optimally perform signal processing based on the product model information for display. For example, if the Exif information includes product model information about the TV set, the display signal processing is not redundantly performed on the still image subjected to the display signal processing. Thus, degradation in the image quality can be prevented.

In a second aspect of the present invention, a computer-readable computer program for causing image signal processing to be executed on a computer system includes a display processing step of performing display processing on an input image signal, a device information processing step of processing device information about an image processing apparatus, a code processing step of converting the image signal processed in the display processing step into a still image file including an image portion and auxiliary information, and an image recording step of recording the converted still image file onto an interchangeably supported external recording medium. In the code processing step, the device information is written as the auxiliary information for format conversion into the still image file.

The computer program in the second aspect of the present invention defines a computer-readable computer program for implementing predetermined processing on a computer system. In other words, the computer program in the second aspect of the present invention is installed in a computer system, to thereby provide cooperation on the computer system. Therefore, similar advantages to those of the image processing apparatus in the first aspect of the present invention are achieved.

In a third aspect of the present invention, an image processing method for processing an image signal includes a display processing step of performing display processing on an input image signal, a device information processing step of processing device information about an image processing apparatus, a code processing step of converting the image signal processed in the display processing step into a still image file including an image portion and auxiliary information, and an image recording step of recording the converted still image file onto an interchangeably supported external recording medium. In the code processing step, the device information is written as the auxiliary information for format conversion into the still image file.

According to the present invention, therefore, superior image processing apparatus and method, and computer program for appropriately recording a video signal, such as a received television signal, onto an external medium are achieved.

Furthermore, according to the present invention, superior image processing apparatus and method, and computer program for appropriately recording currently displayed video onto an external medium as a still image are achieved.

Furthermore, according to the present invention, superior image processing apparatus and method, and computer program for recording a still image extracted from currently displayed video onto an external medium so that the recorded still image can be repeatedly used are achieved.

Other objects, features, and advantages of the present invention will become apparent from the following description of the preferred embodiments of the present invention with reference to the accompanying drawings.

DESCRIPTION OF THE PREFERRED EMBODIMENTS

Embodiments of the present invention will now be described in detail with reference to the drawings.

Figure 1:
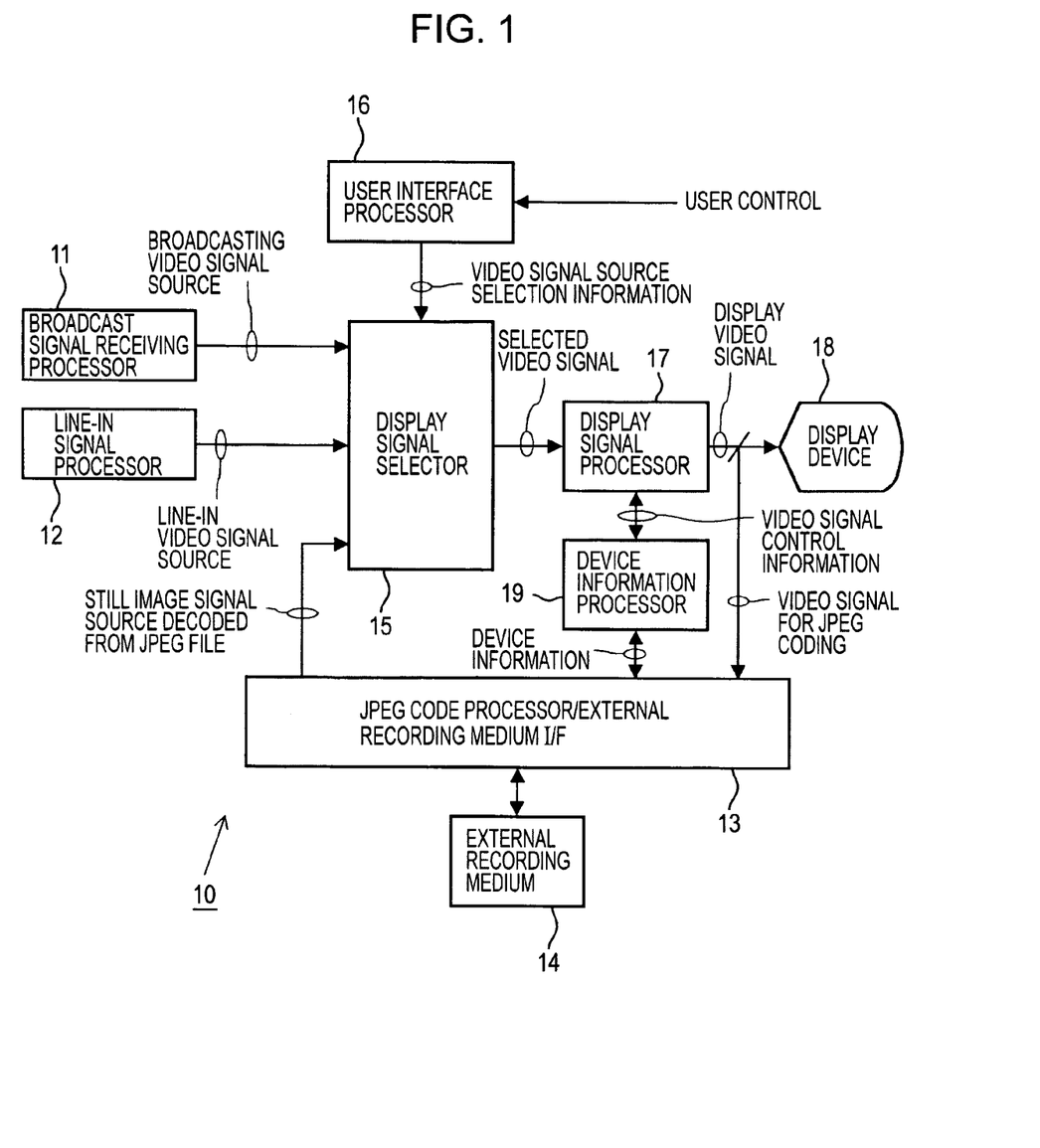
FIG. 1 is a schematic block diagram of a TV set video signal processing system according to the present invention.

FIG. 1 is a schematic block diagram of a TV set video signal processing system 10 according to an embodiment of the present invention.

The video signal processing system 10 receives various video signal sources, e.g., a broadcast signal, and performs appropriate display processing on the received signals, which is then output on a display. The video signal processing system 10 also records currently displayed video onto an external recording medium as a still image at any time in response to an instruction to record the still image (or to attach a memo) from a user. A still image stored in a removable external recording medium is repeatedly used or played back on the same device or other devices.

The video signal processing system 10 shown in FIG. 1 includes a broadcast signal receiving processor 11, a line-in signal processor 12, a JPEG code processor and external recording medium interface (I/F) 13, an external recording medium 14, a display signal selector 15, a user interface processor 16, a display signal processor 17, a display device 18, and a device information processor 19.

The broadcast signal receiving processor 11 decodes a broadcasting video signal source, and outputs the decoded signal source to the display signal selector 15. The line-in signal processor 12 decodes a line-in video signal source, e.g., a line-in signal from an external device (not shown), such as a video tape recorder (VTR), to the TV set, and outputs the decoded signal source to the display signal selector 15.

The JPEG code processor and external recording medium interface 13 has a function for coding and decoding a still image, and a function for interfacing with the external recording medium 14, e.g., a memory stick.

In the coding and decoding function, the JPEG code processor and external recording medium interface 13 converts a still image into a JPEG image file including compressed image data and auxiliary Exif information. In the interfacing function, the JPEG code processor and external recording medium interface 13 interchangeably supports the external recording medium 14 to communicate data via a communication signal compatible with the communication protocol of the external recording medium 14.

The JPEG code processor and external recording medium interface 13 also decodes a JPEG image file read from the external recording medium 14 or a still image signal source input from another medium (not shown), and outputs the decoded image file to the display signal selector 15.

The user interface processor 16 processes a user operation using input buttons and switches provided for the system 10, or control information about the system 10 from the user, such as a user command input using a remote control unit. User control includes general audio and video output commands (not shown), such as selection of a broadcast station or selection of a video signal source, display adjustment, and volume level adjustment, and instructions to record currently displayed video as a still image and to play back the recorded image.

The display signal selector 15 selects any of the broadcasting video signal source, the line-in video signal source, and the still image signal source in response to the video signal source selection information from the user interface processor 16, and outputs the selected video signal to the display signal processor 17.

The device information processor 19 processes or manages device information about the system 10. The device information includes video signal control information, more specifically, information (product model information) about the display device 18, the number of displayed pixels, image modification information, etc.

The display signal processor 17 modifies the video signal selected by the display signal selector 15, and outputs the modified signal to the display device 18 as a display video signal. The display signal processor 17 communicates with the device information processor 19 to obtain the video signal control information, and performs the display signal processing adapted to the display device 18 based on the video signal control information.

The display signal processor 17 also outputs the video signal subjected to the display signal processing adapted to the display device 18 to the JPEG code processor and external recording medium interface 13 for JPEG coding.

An instruction to record video as a still image is input by user control via the user interface processor 16. In order to encode the video into a JPEG still image file, the JPEG code processor and external recording medium interface 13 communicates the device information with the device information processor 19 to obtain the device information, and generates a JPEG file including the obtained device information. The generated JPEG file is recorded onto the external recording medium 14 via a communication signal compatible with the communication protocol of the external recording medium 14. This allows the user to reuse the information included in the video signal without performing any time-consuming operation, and prevents the user from missing the displayed video information. The external recording medium 14 may be removed from the system 10, and the still image recorded in the external recording medium 14 may be played back on other display devices.

The display device 18 incorporated in the TV set may be any of various types, such as a CRT, a PDP, and an LCD. The display methods differ. Thus, even though the signal source is the same, the display video signal output from the display signal processor 17 is optimally modified according to the characteristics of each of the display devices, e.g., the number of pixels and the level. It is expected that the user desires to record the optimally modified display video signal as a still image. As shown in FIG. 1, the signal that is output to the display device 18 is also supplied to the JPEG code processor and external recording medium interface 13 to use the supplied signal as a video signal for JPEG coding.

The JPEG code processor and external recording medium interface 13 reads the JPEG file recorded in the external recording medium 14 via a communication signal compatible with the communication protocol of the external recording medium 14. The JPEG file is decoded to obtain the original still image and the device information added to the still image. The still image is output as a still image signal source to the display signal selector 15, as described above, and the device information is output to the device information processor 19.

The JPEG file is read from the external recording medium 14, for example, in response to user control indicating a still image playback instruction from the user interface processor 16. In this case, the display signal selector 15 selectively outputs the still image signal source from the JPEG code processor and external recording medium interface 13. The display signal processor 17 performs display signal processing on the still image signal according to the device information obtained from the device information processor 19.

The still image signal decoded by the JPEG code processor and external recording medium interface 13 is a still image signal that has been subjected to the display processing by the display signal processor 17. The display signal processing is adapted to the display device 18 in the system 10 when the still image is recorded. If a still image is recorded and played back by the same system 10 without removing the external recording medium 14, the display signal processing is redundant.

Accordingly, in the present embodiment, the display signal processor 17 determines whether or not the product model information of the TV set is defined. If the product model information is defined, signal processing is optimally performed for display based on the product model information.

A file format by which a still image is stored will now be described.

As described above, in the present embodiment, a still image is converted into a JPEG image file. JPEG is an image data format in which 24-bit data is recorded by separating brightness signal components and chrominance signal components, and JPEG-compressed data is expanded using a combination of ADCT (adaptive discrete cosine transformation) and Huffman coding. A JPEG image portion may be recorded together with Exif data indicating photographic conditions, etc. The auxiliary Exif information includes user information tags that can be used by a user.

JPEG is typically used to record still images, and is widely used by digital still cameras or the like. The JPEG file format and file system are specified by JEIDA-49. A TV set converts a still image into a JPEG file according to this standard, thereby providing compatibility with the playback function for the JPEG file complying with this standard.

Figure 2:
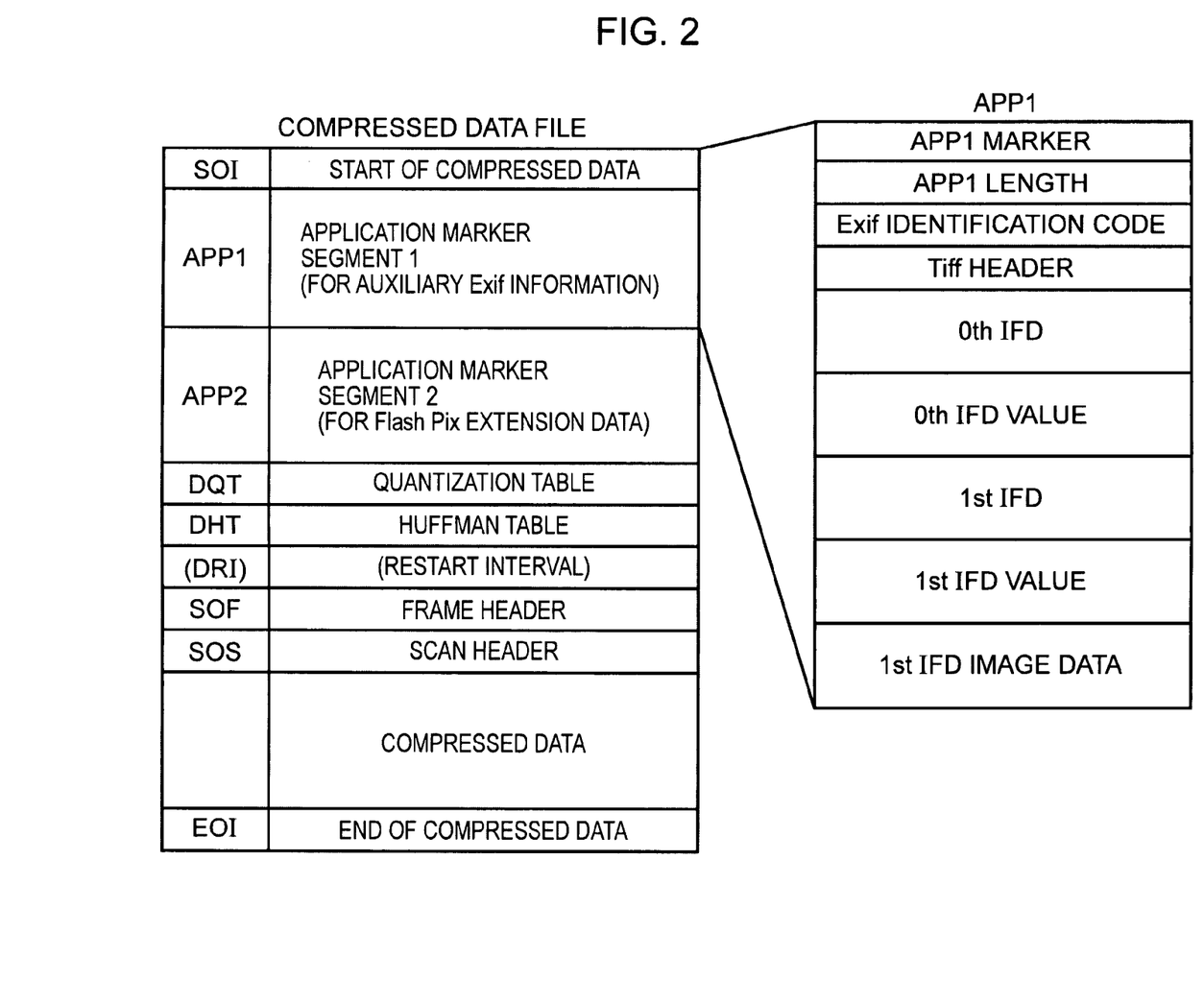
FIG. 2 is a diagram showing the basic structure of JPEG-compressed data.

FIG. 2 shows the basic structure of JPEG-compressed data. APP1 defines auxiliary Exif information shown in FIGS. 3 and 4. This field includes user information tags that can be used by a user, and the user defines any information in this field when creating a JPEG file. Since this tag information is not referred during playback, generally, the playback operation does not depend upon the defined information.

Figure 3:
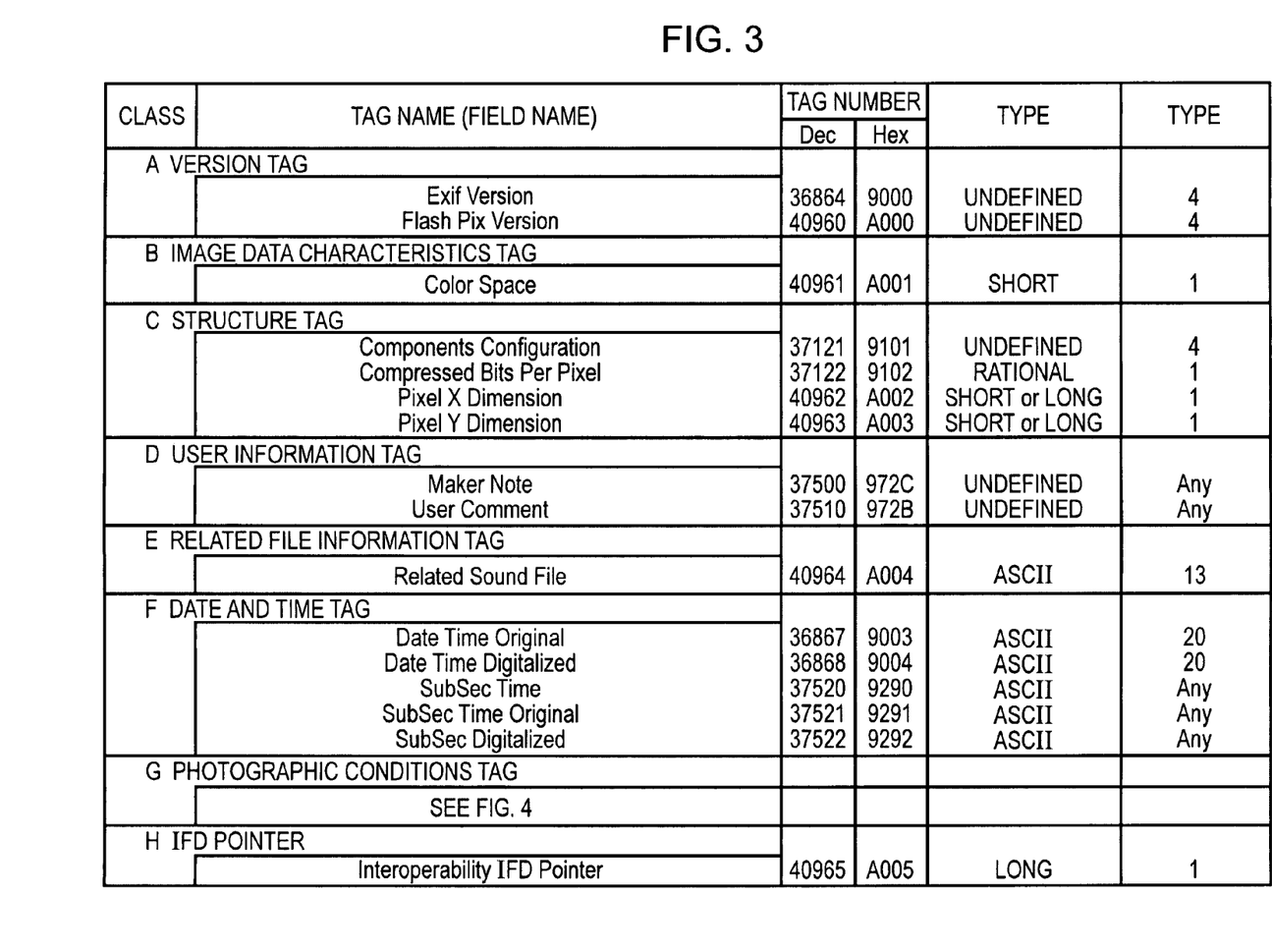
FIG. 3 is a table showing auxiliary Exif information.
Figure 4:
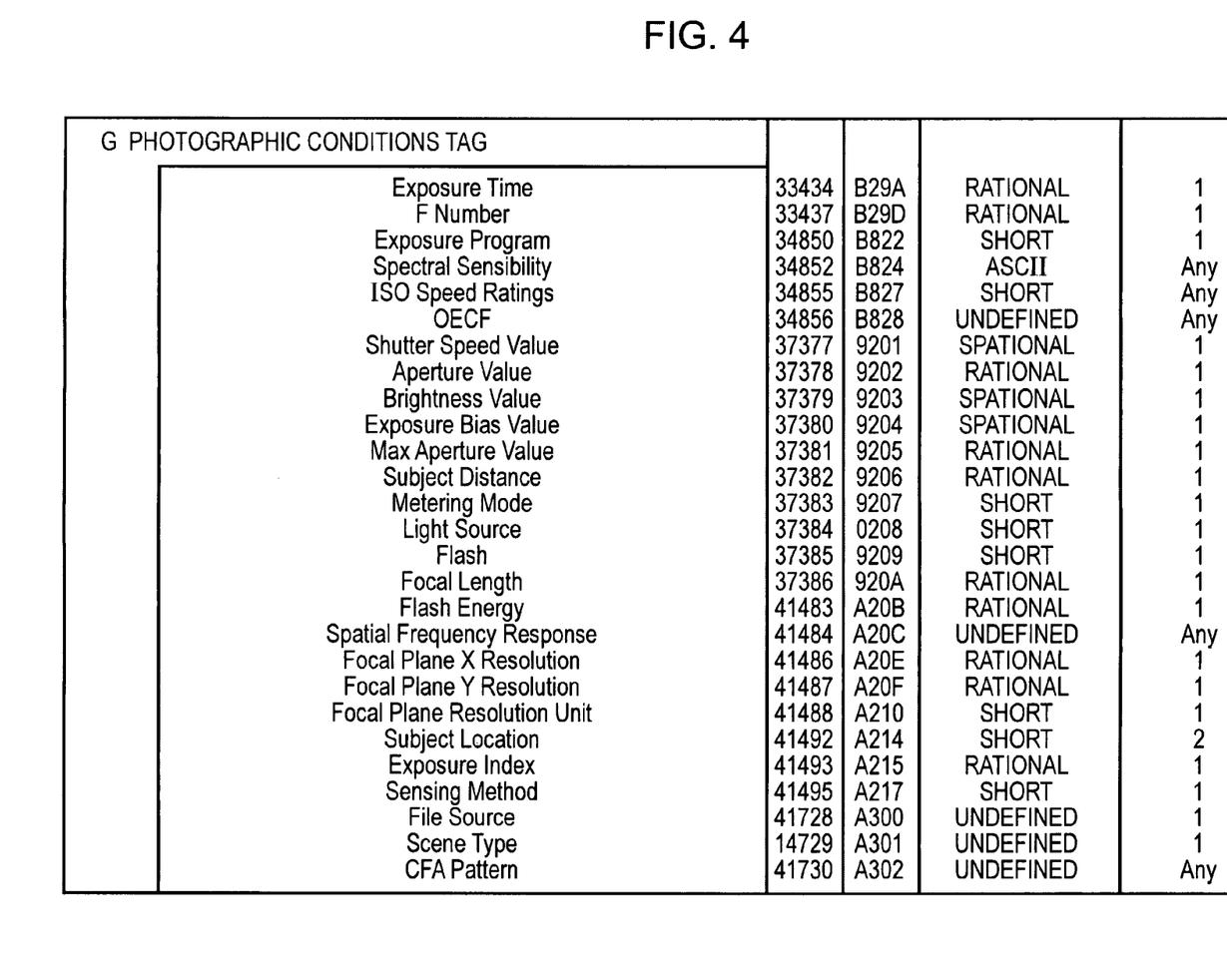
FIG. 4 is a table showing auxiliary Exif information.

The JPEG code processor and external recording medium interface 13 utilizes the flexibility of the auxiliary Exif information, and describes device information indicating information about the display device 18 in the user information tags when encoding the video signal subjected to the display processing into a JPEG file. The device information may be described using any code or item. The device information may include, for example, the display device type, the number of displayed pixels, and image modification information.

The JPEG code processor and external recording medium interface 13 decodes the JPEG file read from the external recording medium 14 for display by referring to the tag information necessary for JPEG decoding and the user information tags, and transmits the tag information, i.e., the device information, to the device information processor 19.

The device information processor 19 determines the modification method for the display signal based on the device information transmitted from the JPEG code processor and external recording medium interface 13, and transmits video signal control information indicating the determined method to the display signal processor 17.

When the user selects the still image signal source and the still image signal that is read from the external recording medium 14 and that is JPEG-coded to the display signal processor 17, the processing method is determined according to the information from the device information processor 19. The display video signal modified by the display signal processor 17 is sent to the display device 18, and the displaying operation is finished.

The sequence for determining the processing method in the device information processor 19 and the modification method for the display signal processor 17 are not specifically defined.

When the TV set 10 records the video signal currently displayed by the TV set 10 onto the external recording medium 14 and the TV set 10 plays back and displays the recorded video signal, the video displayed before recorded and the played-back and displayed video are preferably identical.

Generally, in order to display a video signal source, the image signal modification method is determined for each source. However, like another external source (i.e., the broadcasting or line-in video signal source), if a still image source recorded and played back by the same system is subjected to the display signal processing, the display signal processor 17 performs modification two times, which can cause degradation in the image quality.

For example, when a broadcast signal is displayed, generally, several percent of the outer edge is cut by overscanning before the signal is displayed. When a still image photographed using a digital still camera is displayed, the video signal is converted into a format that provides a smaller display area than the usual display area of the display device 18 so that all pixels can be displayed. If the display signal processing is repeated by the display signal processor 17 during the recording and playback operations, the size of the played back image is smaller than the size of the recorded image. The image quality is also degraded due to format conversion.

In the present embodiment, it is determined whether or not the image signal to be played back has been recorded by the system 10 based on the Exif information, and the modification processing during playback can be changed to different processing according to the determination result.

Specifically, the device information is used to determine whether or not the image signal to be played back has been recorded by the system 10. If the image signal recorded by the system 10 is to be played back, the display signal processing of the display signal processor 17 is not performed (that is, redundant processing is avoided) to prevent the occurrence of a failure, e.g., a change in the image.

Procedures for recording and playing back an image by the video signal processing system 10 according to the present embodiment will now be described.

Figure 5:
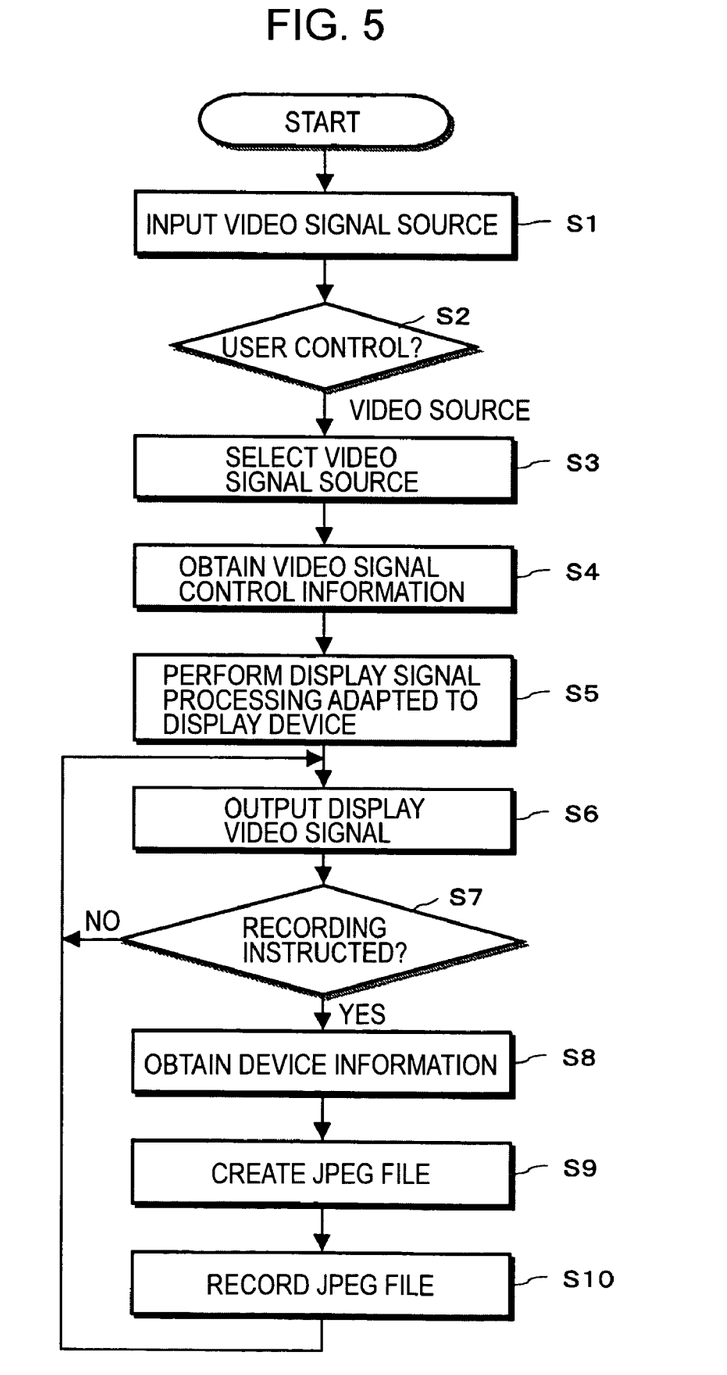
FIG. 5 is a flowchart showing a still image recording process of the video signal processing system.

FIG. 5 is a flowchart showing an image recording process of the video signal processing system 10.

A broadcasting video signal source, a line-in video signal source, and a still image signal source that is read from the external recording medium 14 and that is decoded are supplied to the system 10 (step S1).

In this flowchart, it is presumed that user control indicating an instruction to display the video signal source is executed via the user interface processor 16 (step S2).

The display signal selector 15 outputs only the video signal selected by the user control from the broadcasting video signal source and the line-in video signal source (step S3).

The display signal processor 17 communicates with the device information processor 19 to obtain the video signal control information (step S4), and performs the display signal processing adapted to the display device 18 (step S5).

The display video signal subjected to the display signal processing is displayed on the display device 18 (step S6).

While displaying on the display device 18, the display signal processor 17 also outputs the video signal subjected to the display signal processing adapted to the display device 18 to the JPEG code processor and external recording medium interface 13 for JPEG coding.

If the user instructs recording of the video currently displayed on the display device 18 as a still image (step S7), the JPEG code processor and external recording medium interface 13 communicates the device information with the device information processor 19 to obtain the device information (step S8). Then, a JPEG file including the device information added as auxiliary Exif information is created (step S9) and stored in the external recording medium 14 (step S10). This process allows the user to use the information included in the video signal without performing any time-consuming operation, and prevents the user from missing the displayed video information. The external recording medium 14 may be removed from the system 10, and the recorded still image may be played back on another display device.

Figure 6:
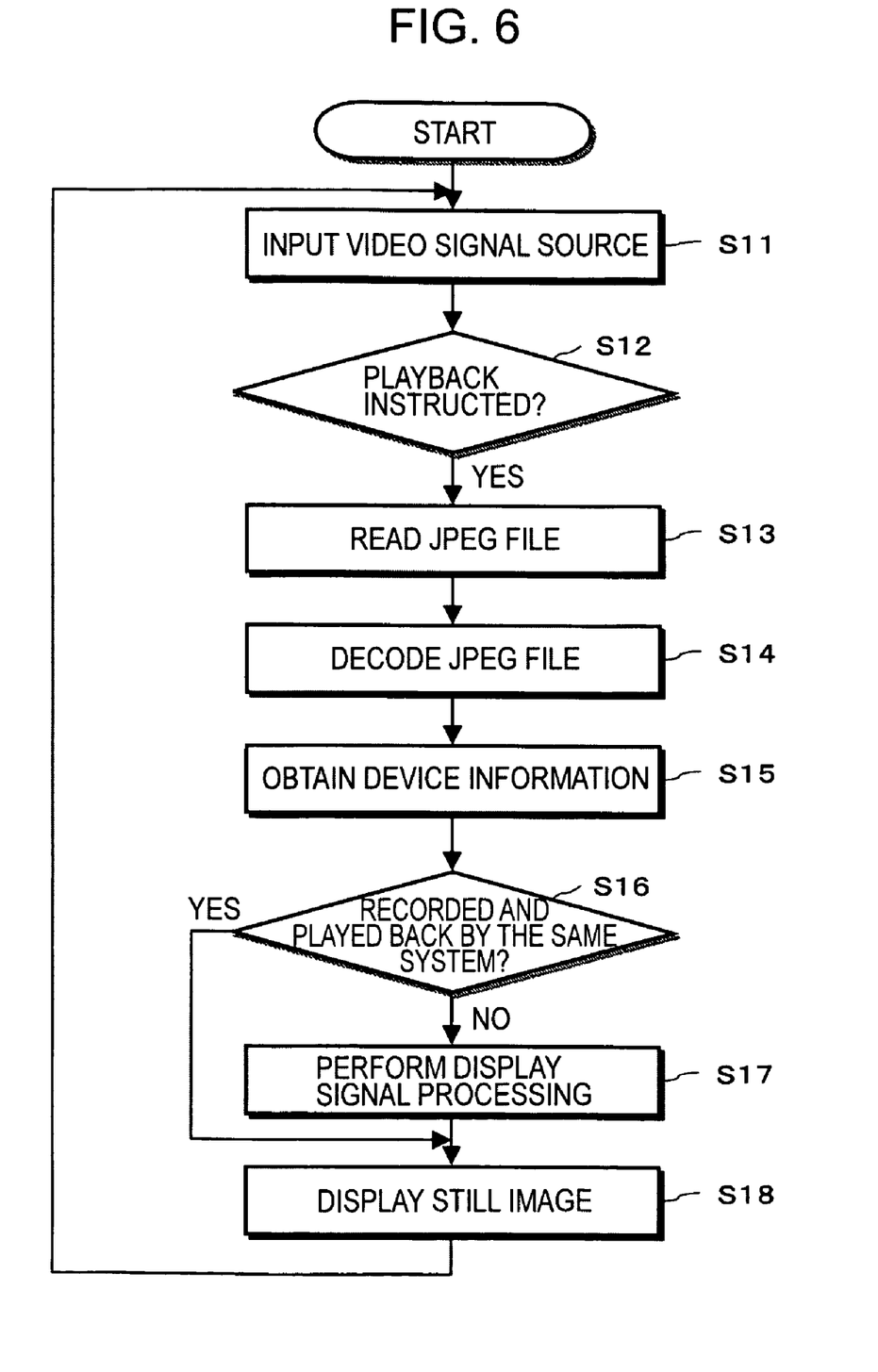
FIG. 6 is a flowchart showing a still image playback process of the video signal processing system.

FIG. 6 is a flowchart showing a still image playback process of the video signal processing system 10.

A broadcasting video signal source, a line-in video signal source, and a still image signal source that is read from the external recording medium 14 and that is decoded are supplied to the system 10 (step S11).

In this flowchart, it is presumed that user control indicating an instruction to display the still image signal source (i.e., an instruction to play back a recorded still image) is executed via the user interface processor 16 (step S12).

The JPEG code processor and external recording medium interface 13 reads a JPEG file from the external recording medium 14 (step S13), and decodes the read JPEG file to obtain a still image signal source and device information (step S14). The still image signal source and the device information are output to the display signal selector 15 and the device information processor 19, respectively.

The display signal selector 15 selects the still image signal source according to the user control performed in step S12, and supplies the selected still image signal source to the display signal processor 17.

Then, the display signal processor 17 communicates with the device information processor 19 to obtain the video signal control information (step S15). Based on the device information, it is determined whether or not recording and playback of the image signal are performed by the system 10, that is, whether or not the image signal to be played back has been recorded by the system 10 (step S16).

If it is determined that both recording and playback of the image signal are performed by the system 10, the display signal processing of the display signal processor 18 is not performed to prevent degradation in the image quality caused by two-time modification.

If it is determined that the image signal to be played back has not been recorded by the system 10, the display signal processing adapted to the display device 18 is performed using the display signal processing method determined based on the device information (step S17).

The display video signal obtained after performing or skipping the display signal processing is displayed on the display device 18 (step S18).

The present invention has been described in detail in the context of specific embodiments. However, it is to be anticipated by those skilled in the art that a variety of modifications and alternatives may be made to the embodiments without departing from the scope of the present invention. The embodiments disclosed in the present invention are merely illustrative, and should not be restrictively construed. Consequently, reference should be made to the appended claims for precise delineation of the true scope of the present invention.

What is claimed is:

1. An image processing apparatus that processes an image signal, comprising:
    an image signal input unit that receives an image signal;
    a display processor that performs display processing on the image signal;
    a code processor that converts the image signal processed by the display processor into a still image file including an image portion and auxiliary information;
    a device information processor that processes device information about the image processing apparatus; and
    an external recording medium input and output unit that interchangeably supports an external recording medium,
    wherein the code processor defines the device information about the image processing apparatus in the auxiliary information for format conversion into the still image file, and
    the external recording medium input and output unit records the converted still image file onto the external recording medium.

2. The apparatus according to claim 1, further comprising a display unit that outputs the image signal processed by the display processor,
    wherein the display processor modifies the image signal so as to be adapted to the display unit.

3. The apparatus according to claim 1, further comprising a user input unit that instructs at least recording of the image signal from a user,
    wherein the code processor converts an image that is displayed when the recording is instructed by the user input unit into a still image.

4. The apparatus according to claim 1, wherein the code processor writes, as the auxiliary information, the device information including information about a display unit, the number of displayed pixels in the display unit, or image modification information in the display processor.

5. The apparatus according to claim 1, wherein the external recording medium input and output unit reads a still image file recorded in the external recording medium,
    the code processor decodes the read still image file to obtain an image portion and auxiliary information,
    the device information processor determines an image display processing method based on the device information defined in the auxiliary information, and
    the display processor performs display processing on the decoded still image using the determined image display processing method, and outputs the processed still image on a display unit.

6. The apparatus according to claim 5, wherein the display processor does not perform the display signal processing when the device information defined in the auxiliary information includes product model information about the image processing apparatus.

7. The apparatus according to claim 1, wherein the code processor converts a still image into a JPEG image file including compressed image data and auxiliary Exif information.

8. An image processing method for processing an image signal, comprising:

a display processing step of performing display processing on an input image signal;

a device information processing step of processing device information about an image processing apparatus;

a code processing step of converting the image signal processed in the display processing step into a still image file including an image portion and auxiliary information; and an image recording step of recording the converted still image file onto an interchangeably supported external recording medium, wherein in the code processing step, the device information is defined in the auxiliary information for format conversion into the still image file.

9. The method according to claim 8, wherein in the display processing step, the image signal is modified so as to be adapted to a display device that outputs the image signal.

10. The method according to claim 8, further comprising a user inputting step of receiving an instruction to record the image signal from a user, wherein the code processing step is performed in response to the instruction received in the user inputting step, and an image that is displayed on a display device when the recording is instructed is converted into a still image.

11. The method according to claim 8, wherein in the code processing step, the device information including information about a display device, the number of displayed pixels in the display device, or image modification information in the display processing step is written as the auxiliary information.

12. The method according to claim 8, further comprising the steps of:

reading a still image file recorded in an external recording medium;

decoding the read still image file to obtain an image portion and auxiliary information;

determining an image display processing method based on the device information defined in the auxiliary information; and outputting the decoded still image on a display unit by performing display processing on the decoded still image using the determined image display processing method.

13. The method according to claim 12, wherein in the display processing step, the display signal processing is not performed when the device information defined in the auxiliary information includes product model information about the image processing apparatus.

14. The method according to claim 8, wherein in the code processing step, a still image is converted into a JPEG image file including compressed image data and auxiliary Exif information.

15. A computer-readable medium encoded with a computer program for causing image signal processing to be executed on a computer system, comprising:

a display processing step of performing display processing on an input image signal;

a device information processing step of processing device information about an image processing apparatus;

a code processing step of converting the image signal processed in the display processing step into a still image file including an image portion and auxiliary information; and an image recording step of recording the converted still image file onto an interchangeably supported external recording medium, wherein in the code processing step, the device information is defined in the auxiliary information for format conversion into the still image file.

* * * * *